US012009966B2

(12) United States Patent
Gangwar et al.

(10) Patent No.: US 12,009,966 B2
(45) Date of Patent: Jun. 11, 2024

(54) MODEM RESET PACKAGE WITH SELF-HEALING

(71) Applicant: ARRIS Enterprises LLC, Suwanee, GA (US)

(72) Inventors: Harshita Gangwar, Bangalore (IN); Harish Shankarachari, Bengaluru (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 0 days.

(21) Appl. No.: 17/365,241

(22) Filed: Jul. 1, 2021

(65) Prior Publication Data
US 2022/0052903 A1 Feb. 17, 2022

Related U.S. Application Data

(60) Provisional application No. 63/065,224, filed on Aug. 13, 2020.

(51) Int. Cl.
*H04L 41/0631* (2022.01)
*H04L 41/0659* (2022.01)
(Continued)

(52) U.S. Cl.
CPC ...... *H04L 41/0631* (2013.01); *H04L 41/0661* (2023.05); *H04L 43/0829* (2013.01); *H04L 43/16* (2013.01)

(58) Field of Classification Search
None
See application file for complete search history.

(56) References Cited

U.S. PATENT DOCUMENTS

| 11,419,066 B2* | 8/2022 | Jeon ................... H04L 1/0061 |
| 2006/0126706 A1* | 6/2006 | Brand .................. H04M 11/066 375/222 |

(Continued)

FOREIGN PATENT DOCUMENTS

| EP | 1 624 669 | 2/2006 |
| KR | 20080052244 A * | 6/2008 |

OTHER PUBLICATIONS

International Search Report and the Written Opinion of the International Searching Authority dated Oct. 13, 2021 in International (PCT) Application No. PCT/US2021/040039.

(Continued)

*Primary Examiner* — John A Follansbee
*Assistant Examiner* — Kamal M Hossain
(74) *Attorney, Agent, or Firm* — Wenderoth, Lind & Ponack, L.L.P.

(57) ABSTRACT

An application or software of a cable modem provides reporting as to one or more issues associated with a reset of a cable modem (CM). Issues related to the upstream (US) link and/or downstream (DS) link of the multiple service operator (MSO) can cause a reboot of a CM coupled to the MSO network. While Data Over Cable Service Interface Specification (DOCSIS) defines various CM reset codes, these codes fail to identify whether the issue that the caused the reset of the CM related to the US link, the DS link or both. The provided system includes a CM for determining the cause of a reset of the CM as one or more reset codes that can be communicated or reported to the MSO so that the MSO has the information necessary to determine any issues or problems with the US link, the DS link or both.

20 Claims, 2 Drawing Sheets

(51) Int. Cl.
*H04L 43/0829* (2022.01)
*H04L 43/16* (2022.01)
*H04L 12/28* (2006.01)

(56) References Cited

U.S. PATENT DOCUMENTS

| | | | |
|---|---|---|---|
| 2006/0153093 | A1 | 7/2006 | Cloonan et al. |
| 2011/0314339 | A1* | 12/2011 | Daily .................. G06F 11/0781 714/E11.029 |
| 2011/0320634 | A1* | 12/2011 | Yang ................... H04L 41/0896 375/222 |
| 2013/0145137 | A1* | 6/2013 | Sartorius ............. G06F 11/1441 713/1 |
| 2017/0149635 | A1 | 5/2017 | Kumar et al. |
| 2018/0352473 | A1* | 12/2018 | Gunasekara .......... H04W 16/14 |
| 2021/0119856 | A1* | 4/2021 | Milley .................... H04L 43/10 |

OTHER PUBLICATIONS

International Preliminary Report on Patentability dated Feb. 7, 2023 in International (PCT) Application No. PCT/US2021/040039.

* cited by examiner

MODEM RESET PACKAGE WITH SELF-HEALING

BACKGROUND

Many home networks include cable modems that operate according to one or more protocols, for example, the Data Over Cable Service Interface Specification (DOCSIS) and the PacketCable standard for telephony service to access various content from a multiple service (or system) operator (MSO) such as a cable provider. DOCSIS, for example, anticipates that communication signals are sent over a hybrid fiber coaxial cable network (HFC) in the downstream (DS) direction from a cable modem (CM), or a telephone modem (TM). The HFC also transports communication signals in the upstream (US) direction from the CM, or TM, towards a cable modem termination system (CMTS) of or associated with the MSO.

On occasion, a CM can reboot due to a variety of issues. For example, a CM can reboot due to an issue related to the shared radio frequency interfaces (referred to as US and DS links, connections or communications). Upon a reset or reboot, a CM typically sends or reports a message to the MSO indicative of the reset or reboot. However, traditional CMs fail to include within the message any indication as to the issue that caused the reboot of the CM, for example, the message fails to indicate whether the reset or reboot was caused by an issue related to the US link, the DS link or both, for example.

Therefore, there is a need to provide improved reporting of the cause associated with a reset or reboot of a CM. Such an improvement will significantly enhance the ability to determine or debug any problem or issue related to US and DS links of the MSO.

SUMMARY

According to aspects of the present disclosure there are provided novel solutions for communicating or reporting one or more issues associated with a reset or reboot of a cable modem (CM). For example, issues related to the upstream (US) link and/or downstream (DS) link of the multiple service operator (MSO) can cause a reset or reboot of a CM coupled to the MSO network. While Data Over Cable Service Interface Specification (DOC SIS) defines various CM reset codes, these DOCSIS CM reset codes fail to identify whether the issue that the caused the reset or reboot of the CM related to the US link, the DS link or both. The provided novel solutions include an application at the CM that provides for determining the cause of a reboot of the CM as one or more reset codes that then can be communicated or reported to the MSO so that the MSO has the information necessary to determine any issues or problems with the US link, the DS link or both.

An aspect of the present disclosure provides a cable modem of a multiple service operator (MSO) network. The cable modem includes a memory storing one or more computer-readable instructions, and a processor configured to execute the one or more computer-readable instructions to perform one or more operations, the one or more operations comprising performing a reset, performing a scan of a downstream channel, an upstream channel or both, wherein the downstream channel and the upstream channel are communicatively coupled to an MSO in the MSO network, determining whether an issue caused the reset based, at least in part, on the scan; and in response to the determination that the issue caused the reset, determining one or more reset codes associated with the reset based, at least in part, on the scan and reporting the one or more reset codes to the MSO.

In an aspect of the present disclosure, the processor is further configured to execute the one or more computer-readable instructions to perform one or more further operations, the one or more further operations comprising determining whether the downstream channel or the upstream channel has been recovered.

In an aspect of the present disclosure, the determining the one or more reset codes associated with the reset based, at least in part, on the scan comprises determining that a power level of the downstream channel is below a threshold and setting at least one of the one or more reset codes to indicate a downstream channel loss.

In an aspect of the present disclosure, the determining the one or reset codes associated with the reset based, at least in part, on the scan comprises determining a failure to acquire an upstream channel and setting at least one of the one or more reset codes to indicate an upstream channel loss.

In an aspect of the present disclosure, the processor is further configured to execute the one or more computer-readable instructions to perform one or more further operations, the one or more further operations comprising performing a self-healing based, at least in part, on the one or more reset codes.

In an aspect of the present disclosure, the reporting the one or more reset codes to the MSO comprises sending a simple network management protocol (SNMP) message to the MSO.

An aspect of the present disclosure provides a method for a cable modem to report to a multiple service operator (MSO) one or more reset codes associated with a reset of the cable modem. The method can include performing a reset, performing a scan of a downstream channel, an upstream channel or both, wherein the downstream channel and the upstream channel are communicatively coupled to an MSO in the MSO network determining whether an issue caused the reset based, at least in part, on the scan, and in response to the determination that the issue caused the reset determining one or more reset codes associated with the reset based, at least in part, on the scan and reporting the one or more reset codes to the MSO.

In an aspect of the present disclosure, the method can further include determining whether the downstream channel or the upstream channel has been recovered.

In an aspect of the present disclosure, the determining the one or more reset codes associated with the reset based, at least in part, on the scan comprises determining that a power level of the downstream channel is below a threshold and setting at least one of the one or more reset codes to indicate a downstream channel loss.

In an aspect of the present disclosure, the determining the one or more reset codes associated with the reset based, at least in part, on the scan comprises determining a failure to acquire the downstream channel and setting at least one of the one or more reset codes to indicate a primary downstream loss.

In an aspect of the present disclosure, the determining the one or more reset codes associated with the reset based, at least in part, on the scan comprises determining a failure to acquire an upstream channel and setting at least one of the one or more reset codes to indicate upstream channel loss.

In an aspect of the present disclosure, the reporting the one or more reset codes to the MSO comprises sending a simple network management protocol (SNMP) message to the MSO.

An aspect of the present disclosure provides a non-transitory computer-readable medium of a cable modem storing a program for reporting one or more reset codes to a multiple service operator (MSO). The program when executed by a processor of the cable modem, causes the cable modem to perform one or more operations including the steps of the methods described above.

The above-described novel solution may be implemented at a CM coupled of an MSO network where the CM is coupled to directly or indirectly to an MSO, such as via a hybrid fiber-coaxial (HFC), according to one or more example embodiments.

Thus, according to various aspects of the present disclosure described herein, it is possible for a CM to report one or more reset codes indicative of an issue associated with the DS link, the US link or both to the MSO upon a reset or reboot of the CM. The novel solution described herein addresses the problem of a reset or reboot of the CM that does not allow for the transmittal of the information necessary for the MSO to determine whether the reboot was caused by an issue at the DS link, the US link or both. In particular, the novel solution provides improvements for debugging a reset or reboot of a CM of an MSO network without requiring replacement of the currently installed CM. For example, a software or application can be installed on a CM located at a subscriber location via a network connection such that no physical replacement of the CM need occur.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
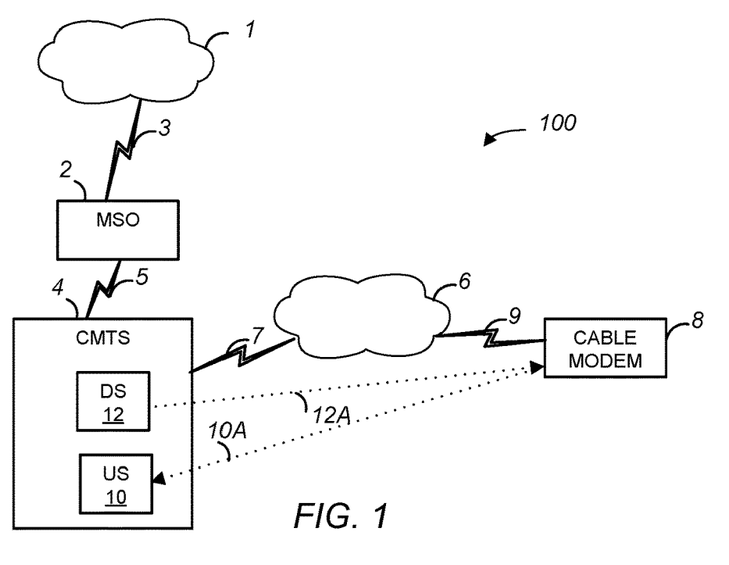
FIG. 1 is a schematic diagram of a multiple service (or system) operator (MSO) network, according to one or more embodiments of the present disclosure.

FIG. 1 is a schematic diagram of a multiple service (or system) operator (MSO) network, according to one or more example embodiments.

It should be appreciated that various example embodiments of inventive concepts disclosed herein are not limited to specific numbers or combinations of devices, and there may be one or multiple of some of the aforementioned electronic apparatuses in the system, which may itself consist of multiple communication networks and various known or future developed wireless connectivity technologies, protocols, devices, and the like.

As shown in FIG. 1, the main elements of the MSO network 100 include an MSO 2, for example, a cable network system operator, connected to a content provider 1 such as an Internet service provider (ISP) or programming provider. In one or more embodiments, the content provider 1 receives content from any source and transmits the content to an MSO 2, for example, via connection 3 using any of a coaxial cable, a fiber optic cable, any other cabling system, a wireless system, a satellite, or combinations thereof. The MSO can include or be connected to a cable mobile termination system (CMTS) 4 via a connection 5. The CMTS 4 can be located at a head end of the MSO 2, for example. The CMTS 4 can include an upstream (US) interface 10 and a downstream (DS) interface 12 for communication with a cable modem (CM) 8, for example, at a subscriber's location. The CMTS 4 can utilize a data over cable service interface specification (DOCSIS) standard for communication of data and/or information by any one or more elements within the MSO network 100. For example, DOCSIS specifies the relationship of the US interface 10 and the DS interface 12. Information associated with the relationship of US interface 10 and the DS interface 12 can be provisioned into a database, a simple network management protocol (SNMP) MIB. Information from this database may be applied by the CMTS 4 to set up the US interface 10 and the DS interface 12 to associate media access control (MAC) domains and a CM 8 associated with each fiber node in the system 100.

The CMTS is connected directly or indirectly via connection 7 to a network 6, such as a hybrid fiber coaxial (HFC) network, a passive optical network (PON) or a combination thereof. The network 6 connects to a cable modem 8 via connection 9. DOCSIS anticipates that communication signals are sent over the network 6 in the DS direction over a DS channel 12A from a CMTS 4 at, for example, the headend of the MSO 2, utilizing DS interface 12 via connections 9 and 7. The network 6 also transports communication signals in the US direction from the CM over a US channel 10A to the CMTS 4, utilizing US interface 10, via connections 9 and 7. While only a single US channel 10A and a single DS channel 12A is shown, the present disclosure contemplates any number of US channels 10A and any number of DS channels 12A.

The content provider 1 can be, for example, a streaming video provider or any computer for connecting the MSO 2 to any content source. Any one or more of the connections 7 and 9 between the CMTS 4 and the CM 8 can be implemented using a DOC SIS network and/or a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G, 5G, or 6G network, for example.

Figure 2:
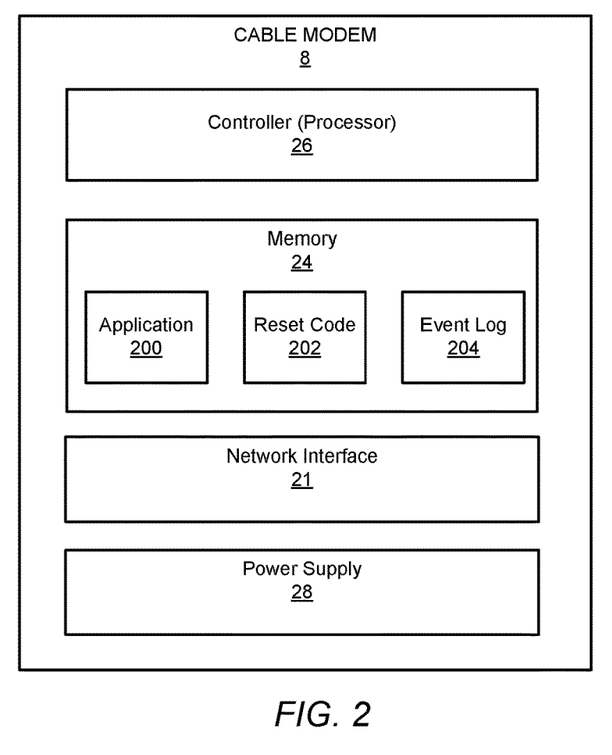
FIG. 2 is a more detailed block diagram illustrating various components of an exemplary cable modem (CM) implemented in the MSO network of FIG. 1 according to one or more embodiments of the present disclosure.

A detailed description of the exemplary internal components of the CM 8 shown in FIG. 1 will be provided in the discussion of FIG. 2. However, in general, it is contemplated by the present disclosure that the CM 8 includes electronic components or electronic computing devices operable to receive, transmit, process, store, and/or manage data and information associated with the MSO network 100, which encompasses any suitable processing device adapted to perform computing tasks consistent with the execution of computer-readable instructions stored in a memory or a computer-readable recording medium (e.g., a non-transitory computer-readable medium).

Further, any, all, or some of the computing components in the CM 8 can be adapted to execute any operating system, including Linux, UNIX, Windows, MacOS, DOS, and ChromOS as well as virtual machines adapted to virtualize execution of a particular operating system, including customized and proprietary operating systems. The CM 8 is further equipped with components to facilitate communication with other computing devices over any network enabling communication in the MSO network 100.

FIG. 2 is a more detailed block diagram illustrating various components of an exemplary CM 8 in the MSO network 100 of FIG. 1, according to some example embodiments.

Although FIG. 2 only shows one CM 8, the CM 8 shown in the figure is meant to be representative of one or more CMs 8 of a network system, for example, MSO network 100 shown in FIG. 1. The connection 9 between the CM 8 and the network 6 and the connection 7 between the network 6 and the CMTS 4 shown in FIG. 2 are meant to be exemplary connections and are not meant to indicate all possible connections between these components or elements, for example, the present disclosure contemplates indirect and direct connections. Additionally, it is contemplated by the present disclosure that the number of CMs 8 is not limited to the number shown in FIGS. 1 and 2.

Now referring to FIG. 2, the CM 8 can include a controller 26, a memory 24, a network interface 21, and a power supply 28. The CM 8 can be, for example, a hardware electronic device that can combine one or more functions of any of a cable modem, any device that includes an Internet Protocol (IP)/ set-top box (STB) (including, but not limited to, a quadrature amplitude modulation (QAM) STB) or other device that is capable of decoding audio/video content, and playing OTT or MSO provided content. The power supply 28 supplies power to the internal components of the CM 8. The power supply 28 can be a self-contained power source such as a battery pack with an interface to be powered through an electrical charger connected to an outlet (e.g., either directly or by way of another device). The power supply 28 can also include a rechargeable battery that can be detached allowing for replacement such as a nickel-cadmium (NiCd), nickel metal hydride (NiMH), a lithium-ion (Li-ion), or a lithium Polymer (Li-pol) battery.

The network interface 21 can include, but is not limited to, various network cards, interfaces, and circuitry implemented in software and/or hardware to enable communications with the CMTS 4, network 6, MSO 2 or any other element or component of MSO network 100 using the communication protocols in accordance with any of connections 9, 7, 5 or a combination thereof (e.g., as described with reference to FIG. 1). For example, the network interface 21 allows for communication between the CM 8 on US channel 10A, DS channel 12A or both. As shown, network interface 21 allows for direct communication with network 6 and indirect communication with MSO 2 via CMTS 4. The present disclosure, however, contemplates a direct and/or indirect communication between any one or more components of MSO network 100.

The network interface 21 may include various network cards, and circuitry implemented in software and/or hardware to enable communications with network 6 using the communication protocols in accordance with connection 9 (e.g., as described with reference to FIG. 1, for example, DOCSIS, PON, or a combination thereof).

The memory 24 includes a single memory or one or more memories or memory locations that include, but are not limited to, a random access memory (RAM), a dynamic random access memory (DRAM), a memory buffer, a hard drive, a database, an erasable programmable read only memory (EPROM), an EEPROM, a read only memory (ROM), a flash memory, logic blocks of a field programmable gate array (FPGA), hard disk or any other various layers of memory hierarchy. The memory 24 can be a non-transitory computer-readable storage medium used to store any type of instructions, software, or algorithm including application or software 200 for reporting one or more reset codes 202 stored in memory 24 associated with one or more event logs 204 stored in memory 24 to the CMTS 4 after a reboot of the CM 8 in accordance with the embodiments described in the present disclosure.

The controller 26 controls the general operations of the CM 8 as well as performs management functions related to communications to and from the CMTS 4 via network 6. For example, the CM 8 can communicate information upstream to the CMTS 4 via a US channel 10A and receive information downstream from the CMTS 4 via a DS channel DS 12A. The controller 26 can include, but is not limited to, a central processing unit (CPU), a network controller, a hardware microprocessor, a hardware processor, a multi-core processor, a single core processor, a FPGA, a microcontroller, an ASIC, a DSP, or other similar processing device capable of executing any type of instructions, algorithms, or software including the application 200 for reporting one or more reset codes 202 in accordance with the embodiments described in the present disclosure including, but not limited to, reporting access codes 204 associated with an event log 204 after a reboot of the CM 8. The controller 26 may also be referred to as a processor, generally.

Figure 3:
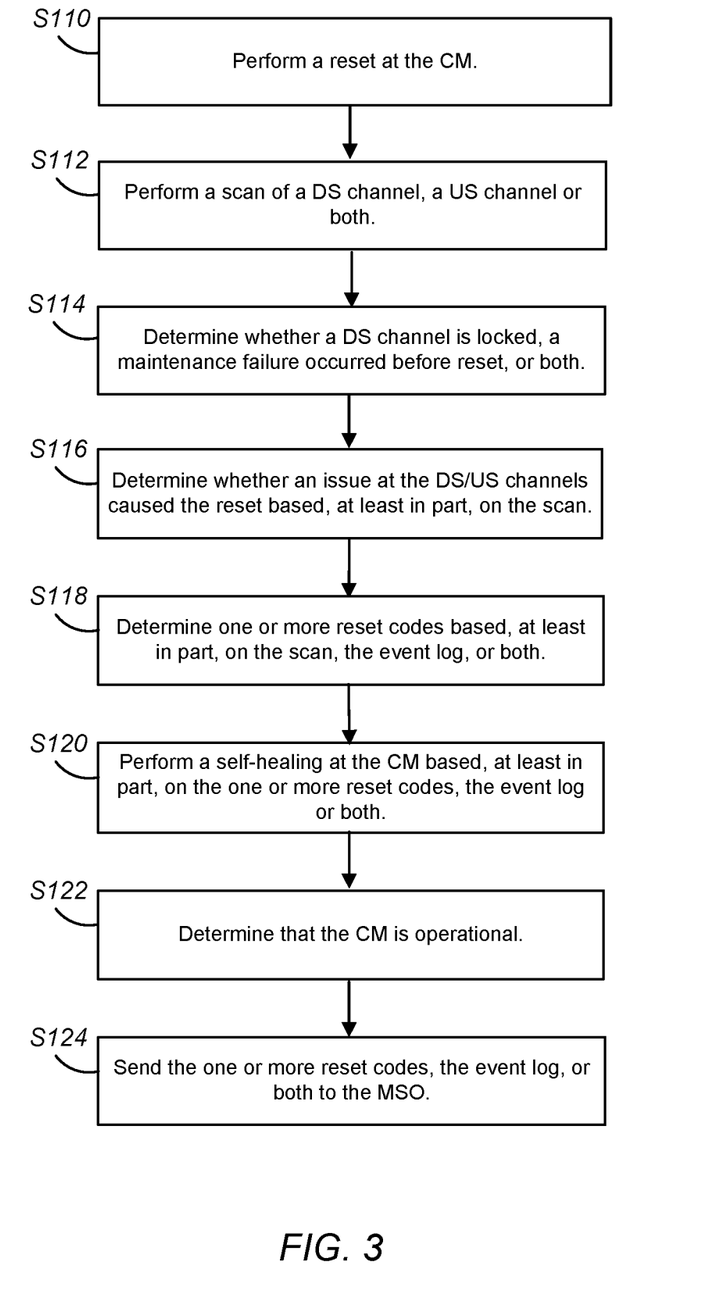
FIG. 3 is a flow chart illustrating a method for reporting to an MSO one or more reset codes associated with a reboot of a CM, according to one or embodiments of the present disclosure.

FIG. 3 is a flow chart illustrating a method for a CM 8 to report to an MSO 2 one or more reset codes 202, an event log 204 or both associated with a reset or reboot of the CM 8, according to one or embodiments of the present disclosure.

In one or more embodiments, a CM 8 may be an electronic device programmed with one or more instructions (e.g., software or application 200) to perform steps for reporting to an MSO one or more reset codes associated with a reboot of the CM 8. In FIG. 6, it is assumed that the devices include their respective controllers and their respective software stored in their respective memories, as discussed above in reference to FIGS. 1-2, which when executed by their respective controllers perform the functions and operations in accordance with the example embodiments of the present disclosure (e.g., including software or application 200).

The CM 8 comprises a controller 26 that executes one or more computer-readable instructions, stored on a memory 24, that when executed perform one or more of the operations of steps S110-S122. In one or more embodiments, the one or more instructions may be one or more software applications, for example, one or more software or applications 200. While the steps S110-S122 are presented in a certain order, the present disclosure contemplates that any one or more steps can be performed simultaneously, substantially simultaneously, repeatedly, in any order or not at all (omitted).

At step S110, a reset is performed at the CM 8. While the present disclosure uses the term "reset", the present disclosure contemplates any cycling of one or mores instructions that cause an initialization and/or reinitialization of the CM 8, for example, a reset of configurations, a reboot of the CM 8, or any other reinitialization or initialization of the CM 8.

At step S112, the software or application 200 of CM 8 performs a scan of a DS channel 12A, a US channel 10A, or both where the DS channel 12A and the US channel 10A are communicatively coupled to an MSO 2 in the MSO network 100. For example, as shown at step S114, the CM 8 scans the DS channel 12A first to determine if the DS channel 12A is locked, the CM 8 determines if maintenance failed before a reset of the CM 8, or both. In one or more embodiments, this determination of maintenance failure can be based, at least in part, on one or more event logs 204. If the DS channel 12A is locked and the CM 8 maintenance did not fail before reset, the method continues to follow the default procedure for bringing the CM 8 to complete operational status. If the DS channel 12 is not locked and/or the CM 8 maintenance failed before a reset of the CM 8, CM 8 can continue by also scanning the US channel 10A. The scans of the DS channel 12A and the US channel 10A are then used as part of the diagnostics of step S116. As one example, as illustrated in FIG. 1, the CM 8 scans DS channel 12A and the US channel 10A of connection 9 that connects the CM 8 to the network 6 which is connects the CM 8 to a CMTS 4 via connection 7 where the CMTS 4 is further connected to an MSO 2 via a connection 5. Each scan can indicate one or more issues associated with the DS channel 12A, the US channel 10A, or both.

At step S116, the software or application 200 of CM 8 determines whether an issue at the DS channel 12A, the US channel 10A or both caused the reset based, at least in part, on the scan of step S114. Whenever an MSO 2 faces any issues related to US interface 10 associated with US channel 10A and/or DS interface 12 associated with DS channel 12A that cause a CM 8 to reset, it can be difficult for the MSO 2 to determine the cause for the reset of CM 8 such as which of US channel 10A and/or DS channel 12A had an issue or even if the cause of the reset is due to the US channel 10A and/or DS channel 12A at all. For example, software or application 200 that comprises one or more instructions is executed by the processor 26 to determine whether an issue with the US channel 10A, the DS channel 12A, or both caused the CM 8 to reset or reboot. The software or application 200 can determine that the reset of the CM 8, for example, was not due to a power failure, power reset, or disconnection of power of CM 8 but rather was due to a failure of the DS channel 12A, the US channel 10A, or both.

At step S118, in response to determining that an issue at the US channel 10A, the DS channel 12A or both caused the reset of the CM 8, the software or application 200 of CM 8 determines one or more reset codes 202 associated with the reset of the CM 8 based, at least in part, on the scan from step S116, an event log 204 or both. The CM 8 can store one or more event logs that correspond with any one or more events associated with the CM 8. For example, DOCSIS defines various codes associated with a reset of a cable modem, however, these codes do not differentiate issues between the US interface 10/US channel 10A and the DS interface 12/DS channel 12A. The software or application 200, though, can utilize the scan of US channel 10A, DS channel 12A or both, the one or more event logs 204, or a combination thereof to determine one or more reset codes 202 that include additional information as to the channel(s) associated with the issue that caused a reset of the CM 8. In one or more embodiments, the event log comprises the one or more reset codes.

In an example, the software or application 200 of CM 8 can determine whether the DS channel 12A has a loss of energy as indicated by a power level of the DS channel 12A. Typically, downstream power level per DS channel 12A is +15 decibel millivolts (dBmV) to −15 dBmV. The software or application 200 can scan the DS channel 12A to determine the power level of the DS channel 12A. If the power level of the DS channel 12A is determined to be below a threshold, for example, −15 dBmV, one or more reset codes 202 can be set to indicate a downstream channel loss (for example, DS_Loss).

In an example, the software or application 200 of CM 8 can determine whether the CM 8 has failed to acquire the DS channel 12A, for example, due to attenuation/noise on the DS channel 12A. For example, typical downstream signal to noise ratio (SNR) for 64 QAM is 23.5 dB or greater, for 256 QAM and downstream power level at −5 dB to +15 dB is 30 dB or greater, and for 256 QAM with downstream power level at −6 dB to +15 dB is 33 dB or greater. The software or application 200 can scan the DS channel 12A to determine a SNR or attenuation/noise. If the SNR or attenuation/noise is determined as indicative of a failure to acquire the DS channel 12A (for example, by comparing the SNR or attenuation/noise to a threshold), then the software or application 200 can set one or more reset codes 202 to indicate such a primary downstream failure or loss (Prim_DS_Loss). In one or more embodiments, the power level of the DS channel 12A may be between the typical power level, for example, at approximately −11.0 dBmV, while the SNR or attenuation/noise is at level indicative of a failure such that the one or more reset codes are set to indicate a Prim_DS_Loss but not a DS_Loss.

In an example, the software or application 200 of CM 8 can determine a failure to acquire the US channel 10A. In one or more embodiments, the software or application 200 can determine, for example, whether the US channel 10A has a loss of energy as indicated by a power level of the US channel 10A. A typical power level per US channel 10A is for one channel between 35 dBmV to 57 dBmV and for two channels between 35 dBmV to 54 dBmV. The software or application 200 can scan the US channel 10A, for example, to determine the power level of the US channel 10A. If the power level of the US channel 10A is determined to be below a threshold, for example, below 35 dBmV, one or more reset codes 202 can be set to indicate an upstream channel loss (for example, US_Loss). In one or more embodiments, the software or application 200 determines whether the DS channel 12A has been acquired before determining a failure to acquire the US channel 10A.

The present disclosure provides example power levels, SNR, attenuation/noise or other boundaries as indicated above, however, the present disclosure contemplates any various acceptable or designated levels or ranges for any type of CM 8.

At step S120, the software or application 200 of CM 8 can perform a self-healing based, at least in part, on the one or more reset codes 202, the event log 204, or both. For example, DOC SIS can include one or more self-healing protocols or steps for the CM 8.

At step S122, the CM determines that the CM is operational such that a connection or communication link with the MSO is established such that the CM can send/receive communications to/from the MSO.

At step S124, the software or application 200 of CM 8 sends the one or more reset codes 202, the event log 204 or both to the MSO 2. For example, the CM 8 can send the one or more reset codes 202 as part of the event log or separately from the event log to a CMTS 4 of the MSO network 100 which communicates the one or more reset codes 202 to the MSO 2. In one or more embodiments, the one or more reset codes 202, the event log 204 or both are sent to the MSO as a part of a simple network management protocol (SNMP) message. For example, sending the one or more reset codes 202, the event log or both to the MSO 2 can comprise the MSO initiating an SNMP management information base (MIB) polling directed to the CM whereupon the CM responds with the one or more reset codes as part of an SNMP message to the MSO or the CM sending an SNMP trap to the MSO with the SNMP trap being indicative of the one or more reset codes (for example, as part of a payload or as a unique object identifier (OID)).

According to some example embodiments of inventive concepts disclosed herein, there are provided novel solutions for reporting one or more reset codes associated with a reset of a CM to an MSO. In addition, there is provided a method for utilizing one or more event codes along with one or more reset codes. In one or more embodiments, the CM 8 continues to execute the software or application 200 so as to perform any one or more of steps S110 to S122 until the software or application 200 determines whether a DS channel 12A, a US channel 10A or both are acquired or recovered.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A cable modem for use in a multiple service operator (MSO) network, comprising:
    a memory storing one or more computer-readable instructions;
    a processor configured to execute the one or more computer-readable instructions to perform one or more operations, the one or more operations comprising:
        performing a reset, wherein the reset causes an initialization, a reinitialization or both of the cable modem;
        after the reset, performing a scan of a downstream channel, an upstream channel or both, wherein the downstream channel and the upstream channel are communicatively coupled to an MSO in the MSO network, wherein the scan indicates one or more issues associated with the downstream channel, the upstream channel, or both that caused the reset;
        determining that an issue of the one or more issues caused the reset based, at least in part, on the scan; and in response to the determination that the issue caused the reset:
   determining one or more reset codes associated with the reset based, at least in part, on the scan, wherein the one or more reset codes are indicative of the issue associated with the downstream channel, the upstream channel or both;
   determining that the cable modem is operational such that a connection or communication link with the MSO is established; and
   reporting the one or more reset codes to the MSO.

2. The cable modem of claim 1, wherein the processor is further configured to execute the one or more computer-readable instructions to perform one or more further operations, the one or more further operations comprising:
   determining whether the downstream channel or the upstream channel has been recovered.

3. The cable modem of claim 1, wherein the determining the one or more reset codes associated with the reset based, at least in part, on the scan comprises:
   determining that a power level of the downstream channel is below a threshold; and
   setting at least one of the one or more reset codes to indicate a downstream channel loss.

4. The cable modem of claim 1, wherein the determining the one or more reset codes associated with the reset based, at least in part, on the scan comprises:
   determining a failure to acquire the downstream channel; and
   setting at least one of the one or more reset codes to indicate a primary downstream loss.

5. The cable modem of claim 1, wherein the determining the one or reset codes associated with the reset based, at least in part, on the scan comprises:
   determining a failure to acquire an upstream channel; and
   setting at least one of the one or more reset codes to indicate an upstream channel loss.

6. The cable modem of claim 1, wherein the processor is further configured to execute the one or more computer-readable instructions to perform one or more further operations, the one or more further operations comprising:
   performing a self-healing based, at least in part, on the one or more reset codes.

7. The cable modem of claim 1, wherein the reporting the one or more reset codes to the MSO comprises sending a simple network management protocol (SNMP) message to the MSO.

8. A method for a cable modem to report to a multiple service operator (MSO) one or more reset codes associated with a reset of the cable modem, the method comprising:
   performing a reset, wherein the reset causes an initialization, a reinitialization or both of the cable modem;
   after the reset, performing a scan of a downstream channel, an upstream channel or both, wherein the downstream channel and the upstream channel are communicatively coupled to an MSO in the MSO network, wherein the scan indicates one or more issues associated with the downstream channel, the upstream channel, or both that caused the reset;
   determining that an issue of the one or more issues caused the reset based, at least in part, on the scan; and
   in response to the determination that the issue caused the reset:
      determining one or more reset codes associated with the reset based, at least in part, on the scan, wherein the one or more reset codes are indicative of the issue associated with the downstream channel, the upstream channel or both;
      determining that the cable modem is operational such that a connection or communication link with the MSO is established; and
      reporting the one or more reset codes to the MSO.

9. The method of claim 8, further comprising:
   determining whether the downstream channel or the upstream channel has been recovered.

10. The method of claim 8, wherein the determining the one or more reset codes associated with the reset based, at least in part, on the scan comprises:
    determining that a power level of the downstream channel is below a threshold; and
    setting at least one of the one or more reset codes to indicate a downstream channel loss.

11. The method of claim 8, wherein the determining the one or more reset codes associated with the reset based, at least in part, on the scan comprises:
    determining a failure to acquire the downstream channel; and
    setting at least one of the one or more reset codes to indicate a primary downstream loss.

12. The method of claim 8, wherein the determining the one or more reset codes associated with the reset based, at least in part, on the scan comprises:
    determining a failure to acquire an upstream channel; and
    setting at least one of the one or more reset codes to indicate upstream channel loss.

13. The method of claim 8, further comprising:
    performing a self-healing based, at least in part, on the one or more reset codes.

14. The method of claim 8, wherein the reporting the one or more reset codes to the MSO comprises sending a simple network management protocol (SNMP) message to the MSO.

15. A non-transitory computer-readable medium of a cable modem storing a program for reporting one or more reset codes to a multiple service operator (MSO), which when executed by a processor of the cable modem, causes the cable modem to perform one or more operations comprising:
    performing a reset, wherein the reset causes an initialization, a reinitialization or both of the cable modem;
    after the reset, performing a scan of a downstream channel, an upstream channel or both, wherein the downstream channel and the upstream channel are communicatively coupled to an MSO in the MSO network, wherein the scan indicates one or more issues associated with the downstream channel, the upstream channel, or both that caused the reset;
    determining that an issue of the one or more issues the reset based, at least in part, on the scan; and
    in response to the determination that the issue caused the reset:
       determining one or more reset codes associated with the reset based, at least in part, on the scan, wherein the one or more reset codes are indicative of the issue associated with the downstream channel, the upstream channel or both;
       determining that the cable modem is operational such that a connection or communication link with the MSO is established; and
       reporting the one or more reset codes to the MSO.

16. The computer-readable medium of claim 15, wherein the program, when executed by the processor, further causes the cable modem to perform one or more further operations comprising:
    determining whether the downstream channel or the upstream channel has been recovered.

17. The computer-readable medium of claim 15, wherein the determining the one or more reset codes associated with the reset based, at least in part, on the scan comprises:
    determining that a power level of the downstream channel is below a threshold; and
    setting at least one of the one or more reset codes to indicate a downstream channel loss.

18. The computer-readable medium of claim 15, wherein the determining the one or more reset codes associated with the reset based, at least in part, on the scan comprises:
    determining a failure to acquire the downstream channel; and
    setting at least one of the one or more reset codes to indicate a primary downstream loss.

19. The computer-readable medium of claim 15, wherein the determining the one or more reset codes associated with the reset based, at least in part, on the scan comprises:
    determining a failure to acquire an upstream channel; and
    setting at least one of the one or more reset codes to indicate upstream channel loss.

20. The computer-readable medium of claim 15, wherein the reporting the one or more reset codes to the MSO comprises sending a simple network management protocol (SNMP) message to the MSO.

* * * * *